United States Patent Office 2,787,601
Patented Apr. 2, 1957

2,787,601

CELLULAR PLASTIC MATERIALS WHICH ARE CONDENSATION PRODUCTS OF HYDROXY CONTAINING FATTY ACID GLYCERIDES AND ARYLENE DIISOCYANATES

Stanley R. Detrick, Wilmington, and Eric Barthel, Jr., New Castle, Del., assignors to E. I. du Pont de Nemours & Company, Wilmington, Del., a corporation of Delaware No Drawing. Application March 3, 1953,
Serial No. 340,168

8 Claims. (Cl. 260—2.5)

This invention relates to new and valuable cellular plastic materials, and more particularly to cellular plastic materials which are condensation products of hydroxy-containing fatty acid glycerides and arylene diisocyanates that have been further reacted wtih water.

Cellular plastic products or plastic foams have been prepared in which isocyanates are used as one of the reactants—see, for instance, "German Plastics Practice," by De Bell, Goggin and Gloor, 1946, pp. 316, 463–465. In these products the cellular materials are prepared from alkyd resins which contain free carboxy groups. Products of this nature which have appeared on the market are not as resistant to destructive mechanical action as could be desired, since by compression, flexing or impact they are readily deformed or destroyed.

It is an object of the present invention to produce from readily available chemicals cellular plastic materials of improved properties which are in general useful where cellular plastics are of value and particularly as insulation material. A further object is to provide cellular plastic materials which have high insulation value and low apparent density. A still further object of the invention is to provide cellular plastic material which can be readily formed in the place where it is to be used, and therefore need not be premolded or prepared under special reaction conditions.

The cellular plastic material of this invention is preferably produced by reacting an arylene diisocyanate with an amount of a fatty acid triglyceride having an hydroxyl number not materially less than 49, such that the ratio of the number of hydroxyl groups contained in the fatty acid triglyceride to the number of isocyanate groups in the arylene diisocyanate is greater than 0.45 to 2 but not more than 0.95 to 2 (which leaves from 52.5% to 77.5% of the isocyanate groups unreacted), and mixing the reaction product with an amount of water that is substantially stoichiometrically equivalent to the unreacted isocyanate groups (—NCO) in the mass. In general this amount of water will be with from 0.4 to 1.7 mols per mol of arylene diisocyanate employed. By "stoichiometrically equivalent" is meant one mol of water per two isocyanate (—NCO) groups. The fatty acid triglycerides may be the naturally occurring oils containing the ricinoleic acid glyceride or the blown drying oils commonly referred to in the trade as "heavy bodied" oils such as blown linseed, tung, poppyseed, hempseed, soya oil, etc.

These products are prepared in two steps. In the first step a diisocyanate is reacted with a hydroxy containing fatty acid triglyceride to form what may be called a prepolymer. The proportion of diisocyanate to fatty acid glyceride should be such that when not more than 47.5% of the total isocyanate groups in the diisocyanate have reacted with the hydroxyl groups on the fatty acid radicals, there are no longer any remaining available hydroxyl groups. This leaves then more than half of the original isocyanate groups available for further reaction. Thus it is postulated that in the case of, for example, castor oil, each of the hydroxy groups on the three fatty acid chains attached to the glyceride is reacted with one of the isocyanate groups on the organic diisocyanate with the formation of a urethane link. This then gives a fatty acid glyceride having attached to each fatty acid chain an isocyanate group which is free to react with any reactive hydrogens plus unreacted diisocyanate. Using 2,4-tolylene diisocyanate as an example, one can postulate the following idealized structural formula:

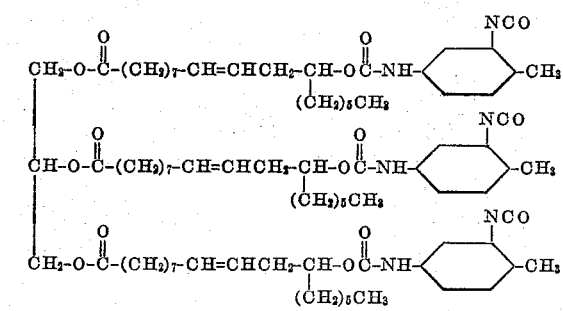

This product is then mixed with water and a small amount of tertiary amine catalyst to accelerate the reaction. The reaction mass immediately begins to foam due to the reaction of the unreacted isocyanate groups with the water to form $CO_2$ and substituted ureas. If the foam is confined in a formed space then the foam will fill up that space and in a relatively short time will cure at room temperature to a firm, non-brittle sponge that is resistant to damage by compression.

By using the amount of isocyanate as given above, so that the ratio of the number of —OH groups to —NCO groups is between 0.45 to 2 and 0.95 to 2, there is never enough fatty acid glyceride to completely react with one isocyanate group on all of the aromatic organic diisocyanate. On the other hand, at the lower end of the range there is never too large an excess of organic diisocyanate. When the ratio is greater than 0.95 to 2, a soft, pliable plastic material is obtained which is more dense, that is, has too small pore size and a lower softening point than is usually desirable where the material is to be worked as herein described. When the ratio is lower than 0.45 to 2, a brittle, friable sponge is obtained which lacks abrasion resistance and also lacks compressive resistance. On the other hand, when the ratio is between 0.45 to 2 and 0.95 to 2, a resilient compression-resistant sponge is obtained. When the sponge is compressed it returns to its previous form without destroying the cells.

The amount of water which is added should be sufficient to react with the diisocyanate groups remaining after the condensation of the glyceride with the diisocyanate, but preferably not in too large an excess. When the ratio of —OH to —NCO groups is low, that is, in the region of from 0.45 to 2 and 0.6 to 2, a larger number of diisocyanate groups will remain unreacted and consequently a larger proportion of water may be used. If more water is added than is theoretically necessary for reaction with the diisocyanate groups, that water will temporarily remain in the foam and act somewhat as a plasticizer, and therefore the use of a large excess is not desirable. If an insufficient amount of water is added to react with all of the free isocyanate groups, these isocyanate groups are then free to react with other active hydrogens in the resin. Since the reaction of water with two diisocyanate groups results in the formation of a substituted urea with the liberation of carbon dioxide, the hydrogens remaining on these substituted urea groups are reactive and any excess isocyanate groups may react with those hydrogens and cross-link. This usually will have the effect of giving more rigidity to the sponge than when the amount of water is sufficient to react with all of the isocyanate groups.

The fatty acid glyceride should have an hydroxyl number not materially less than 49, for when a fatty acid glyceride having too low an hydroxyl number is used there is an insufficient amount of diisocyanate left free to react with the water and form the necessary amount of carbon dioxide for proper blowing of the sponge. If additional diisocyanate should be added to overcome this deficiency, then the ratio of numbers of —OH to —NCO groups is too low and a more brittle and less desirable sponge or cellular product is obtained. The glycerides having an hydroxyl number up to 180 may of course be used. This top number is not a limitation except from a practical standpoint for it is the hydroxyl number of the pure triglyceride of ricinoleic acid. Naturally occurring oils with a higher hydroxyl number are not known, and it is difficult to oxidize unsaturated oils to an extent where products are produced having a higher hydroxyl number.

A tertiary amine catalyst is preferably used with the water in forming the sponge because this accelerates the reaction between the isocyanate and the water. The catalyst may be omitted and a longer time of curing may be used, or elevated temperatures may be used in order to speed the reaction. However, it is much simpler and more practical to add the tertiary amine catalyst to cause the reaction to take place rapidly and permit the final curing at room temperature.

By using substantially the proportions of fatty acid triglyceride and arylene diisocyanate given above, a prepolymer is obtained having a viscosity within the range of from about 750 to 75,000 centipoises at 30° C. At these viscosities the carbon dioxide which is evolved does not escape from the mass to any extent, and still the mass is capable of being properly blown into a cellular mass. If the viscosities are too low, the carbon dioxide would merely bubble out and escape, while at too high a viscosity satisfactory mixing cannot be obtained and nonuniform cellular products of higher density result.

Often there is a slight initial shrinkage in unsupported foams which disappears on standing. This is believed to be a temperature effect due to the cooling of the foam after curing. On standing, air diffuses into the cells and they resume their original size.

The following tertiary amines are illustrative of those useful as catalysts in this reaction: triethylamine, diethyl cyclohexylamine, dimethyl hexadecylamine, dimethyl cetylamine, triethanolamine, pyridine, quinoline, 3-methyl-isoquinoline. The more basic amines appear to be the most effective as catalysts, and those of relatively low volatility are preferred so that they will not escape to an objectionable degree during the reaction and so they will not impart to the product an objectionable odor.

A wide variety of arylene diisocyanates may be employed to produce the products of this invention. Representative of the types that may be used are: tolylene-2,4-diisocyanate, metaphenylene diisocyanate, 1-chlorophenylene-2,4-diisocyanate, xenylene-4,4'-diisocyanate and naphthalene-1,5-diisocyanate. In general, the diisocyanates of the benzene and naphthalene series may be employed.

It is frequently desirable to use a dispersing agent in the water as it is mixed with the prepolymer. Usually from one-half percent to one percent of dispersing agent is sufficient; however, some of the higher molecular weight compounds hereinafter mentioned which assist in forming the dispersion also operate as modifiers of the resulting cellular plastic material, and therefore may be used in larger amounts. Among the dispersing agents which have been found to be satisfactory are: sodium carboxy methyl cellulose, lignin sulfonates, lauric acid ester of triethanolamine, gelatine, diethyl cyclohexylamine salt of alkyl sulfates containing from 12 to 16 carbon atoms, and the polyalkylene oxide glycols such as polyethylene oxide glycol or polypropylene oxide glycol, or mixtures of the two.

Additives such as fillers, extenders, modifiers, etc., may also be incorporated into the material to give various effects to the sponge structure. Generally speaking these materials give more rigid, more brittle and more dense products. Consequently, when they are used they are added in minor amounts. Such products include magnesium carbonate, powdered wood cellulose, bentonite, silicon dioxide, calcium silicate, carbon black, glass fiber, magnesium stearate, methylene distearamide, etc. Magnesium stearate appears to cause somewhat larger cell structure and somewhat thicker cell walls.

These cellular materials have insulating properties similar to commercially available insulating materials but are generally much lighter and consequently offer a considerable saving where weight is of particular importance. As will be illustrated in the examples, it is quite possible to apply this type of insulating to various pieces of equipment, pipe etc., with a minimum amount of labor. For example, a simple cardboard mold may be built around the pipe and the plastic material can be poured into the mold. It foams up inside the mold and cures in place. The cardboard mold may then be stripped off and the insulation can be left as is, or can be painted.

The material may also be used to furnish insulation inside a formed body. For example, a refrigerator door consists of an inner and outer side. The freshly mixed mass may be poured into such a compartment and permitted to foam up, thereby filling the cavity. Obviously these cellular plastics may be molded in any desired shape, or readily cut into desired shapes from preformed blocks or sheets. This foam has an advantage over the foams of the prior art in that it is much stronger and less apt to break on compression. In other words, it has a resilience combined with a resistance to damage by compression which the other plastic cellular materials do not have.

PREPARATION OF PREPOLYMERS

The prepolymer is prepared by mixing the organic diisocyanate and the hydroxyl containing fatty acid glyceride in a vessel and heating to about 70° to 95° C. for from 12 to 30 minutes and then cooling to room temperature. During this heating it is essential that the reaction mixture be protected from atmospheric moisture either by use of a drying agent on the exit of the vessel or by maintaining a moisture-free atmosphere of an inert gas such as air or nitrogen. The reaction of the two compounds is somewhat exothermic but not excessively so. After reaction the prepolymer is cooled to room temperature and then may be used to prepare the foamed plastic. The following prepolymers were prepared in the above manner.

A. 100 g. (0.57 mol) 2,4-tolylene diisocyanate
150 g. castor oil (hydroxyl No. 161.5)
(—OH to —NCO ratio=0.77 to 2.0)

B. 112.5 g. (0.65 mol) 2,4-tolylene diisocyanate
137.5 g. castor oil (hydroxyl No.161.5)
(—OH to —NCO ratio=0.62 to 2.0)

C. 125 g. (0.72 mol) 2,4-tolylene diisocyanate
125 g. castor oil (hydroxyl No. 161.5)
(—OH to —NCO ratio=0.5 to 2.0)

D. 40 g. (0.23 mol) 2,4-tolylene diisocyanate
60 g. hydrogenated castor oil, N. W. 950 (hydroxyl No. about 160)
(—OH to —NCO ratio=0.83 to 2.0)

E. 30 g. (0.12 mol) methylene bis(4-phenyl isocyanate)
20 g. castor oil (hydroxyl No. 161.5)
(—OH to —NCO ratio=0.48 to 2.0)

F. 18.3 g. (0.105 mol) 2,4-tolylene diisocyanate
105 g. heavy-bodied linseed oil (hydroxyl No. 66.5)
(—OH to —NCO ratio=0.95 to 2.0)

G. 35.7 g. (0.2 mol) 2,4-tolylene diisocyanate
112.6 g. heavy-bodied soya oil (hydroxyl No. 49)
(—OH to —NCO ratio=0.5 to 2.0)

The following examples are given to further illustrate the invention.

A "Hamilton-Beach" drink mixer was used for mixing together the prepolymer with the water and other ingredients in the following examples. Any other machine which gives very efficient and rapid agitation is satisfactory.

Example 1

47 grams of prepolymer A and 3 grams of finely divided magnesium stearate were mixed together with the electric mixer. To this mixture was then added 1 gram of water and 0.9 gram of diethyl cyclohexylamine. After stirring for about 30 seconds the mixture assumed the appearance of whipped cream due to the formation of tiny gas bubbles. This foamy mass was then immediately transferred to a metal mold which was open at the top and which was 4 x 4 x 4 inches. This mold had previously been coated with a solution of paraffin wax in petroleum ether so that the wax could act as a mold release agent. The foamy mass reached its maximum volume, which was about 58 cubic inches, within two to three minutes. After ten minutes' standing at room temperature the material had cured to a rigid cellular mass with cells ranging in diameter from about 1 to 5 mm. The apparent density of this mass was between 2.8 and 3.1 lbs. per cubic foot. A cross-sectional slab of this material was found to have a thermal conductivity value of 0.4824 B. t. u. per hour per square foot of area per degree Fahrenheit per inch of thickness.

Example 2

The procedure was the same as Example 1, and the following ingredients were used: 50 g. of prepolymer A, 2 g. of magnesium stearate, 3 g. of triethanolamine, 0.9 g. of diethyl cyclohexylamine and 1 g. of water. The resulting cellular product was semi-rigid with cells ranging in size from 1 to 5 mm. in diameter. The density was about 3 lbs. per cu. ft.

Example 3

The procedure was the same as Example 1. The ingredients were 44 g. of prepolymer C, 5 g. of triethanolamine, 1 g. of water and 0.9 g. of diethyl cyclohexylamine. A pliable and resilient sponge was obtained which had cell sizes of about 1 to 2 mm. in diameter. The density was about 4.5 pounds per cubic foot.

Example 4

The procedure was the same as for Example 1. The ingredients were 48 g. of prepolymer A, 2 g. of methylene bis stearamide, 3 g. of 3-methyl isoquinoline, 1 g. of water. The foam formation in this experiment was much slower than in the previous experiments and the time for cure was about 2 hours. This is the result of the change in the tertiary amine catalysts. The resulting product had a small cell structure, 1 to 3 mm. in diameter, and had a density of about 6.5 lbs. per cu. ft.

Example 5

The procedure was the same as in Example 1. The ingredients were 45 g. of prepolymer B, 5 g. of lignin sulfonate, 1 g. of water, and 0.9 g. of diethyl cyclohexylamine. The resulting product was brown in color and was pliable and resilient to the touch. It had small, uniform cells of about 1 to 3 mm. in diameter and the density was about 2.8 lbs. per cu. ft.

Example 6

The procedure was the same as in Example 1. The ingredients were 50 g. of prepolymer E, 3 g. of magnesium stearate, 0.45 g. of diethyl cyclohexylamine and 1 g. of water. The resulting product was rigid and very tough. It was brown in color and had small uniform cells 1 to 2 mm. in diameter. The density was about 4.5 lbs. per cu. ft.

Example 7

The procedure was the same as in Example 1. The ingredients were 40 g. of prepolymer D, 1 g. of pyridine, and 1 g. of water. The resulting material was very rigid and had cells 1 to 3 mm. in diameter. The density was about 6 lbs. per cu. ft. In this example about 4 hours was necessary before the final cure was complete.

Example 8

The procedure was the same as in Example 1. The ingredients were 50 g. of prepolymer G, 1.3 g. of water and 0.9 g. of diethyl cyclohexylamine. The resulting product had a density of 4.2 lbs. per cu. ft. and was resilient, non-tacky and non-friable. The cell structure was quite uniform, the cells being about 1 to 3 mm. in diameter.

Example 9

The procedure was the same as in Example 1. The ingredients were 40 g. of prepolymer F, 4 g. of 2,4-tolylene diisocyanate, 1 g. of water and 0.9 g. of diethyl cyclohexylamine. The cell structure of the resulting material was quite uniform and averaged about 1 to 2 mm. in diameter. It was quite resilient and non-friable.

Example 10

In this example a section of pipe was coated with the material as an insulator. The pipe was 27.5 cm. long and 3.2 cm. in outside diameter and had a flange on each end which was 11 cm. in diameter. A piece of light cardboard lined with polyethylene sheeting was fitted around the flanges so as to form a closed cylinder. A narrow slot was cut in the top of the cardboard for the addition of the foaming mixture. The foaming mixture was prepared as in Example 1, and the ingredients were 101.5 g. of prepolymer C, 3.5 g. of water and 1.5 g. of diethyl cyclohexylamine. After stirring, this material was poured into the slot and allowed to foam around the pipe. After one hour the cardboard and polyethylene were removed, leaving the pipe covered with the cellular plastic material which had small uniform cells and a smooth and pliant resilient surface. In order to demonstrate the utility of this type of product as an insulation, acetone at −55° to −40° C. was circulated through the pipe for 24 hours. The surface of the foam remained at room temperature. No evidence was detected that the low temperature caused brittleness.

Example 11

In a manner similar to Example 10, a pipe 61 cm. long and 4.9 cm. in outside diameter with 13 cm. diameter flanges was insulated with a mixture prepared from 492 g. of prepolymer A, 20 g. of magnesium stearate, 30 g. of triethanolamine, 10 g. of water and 4.5 g. of diethyl cyclohexylamine. The product foamed into place around the pipe in the same manner as that in Example 10, and the covering was resilient and had cells ranging in size from 1 to 5 mm. in diameter. As the test for insulation, low pressure steam was circulated through this pipe for 24 hours. A thermometer placed at the junction of the pipe and insulation registered 90° to 94° C. The outer surface of the insulation remained at room temperature. The inner portion of the foam became softer and more plastic at the higher temperature, but did not melt or lose its shape.

Samples were cut from the foams prepared in the above examples and subjected to testing as hereinafter described. Samples of commercially available isocyanate foam products which were prepared according to the manufacturers' directions were also tested in the same manner.

*Flexural test.*—To determine ability to withstand bending. A specimen of foam ½ x 1 x 3 inches was supported flat between pieces of metal 2 inches apart and ½ inch high. A metal strip was gently forced down upon the mid-point of the foam and the foam deflected ½ inch. The specimen of foam either broke before the ½ inch deflection, formed a small crack on the under surface without a complete break, or could be subjected to the ½ inch deflection without being damaged.

*Compression test.*—A measure of resilience; the ability to be compressed and regain shape. A one inch cube of foam was compressed to ½ inch height and allowed to expand. The height of the cube was then measured after being released for one hour, then after twenty hours. Where the samples recovered, the maximum recovery was attained in the first hour. Duplicate samples were run and the final heights are recorded in the table.

*Impact test.*—A 1000 g. weight was dropped through a guide tube of cardboard a distance of 11 inches (bottom of weight to top of 1 inch cube sample) onto the sample of foam being tested.

RESULTS OF PHYSICAL TESTS

| Example | Flexural Test [1] | Compression Test, Final Height | Impact Test [2] |
|---|---|---|---|
| 1 | C at ⅜″ deflection NB | 1 inch | a |
| 2 | NH | ⅞, 15/16 inch | a |
| 3 | NH | ⅞, 15/16 inch | a |
| 4 | C at ⅜″ deflection NB | 1 inch | a |
| 5 | C at ¼″ deflection NB | 1 inch | a |
| 6 | C at ¼″, B at ½″ deflection | ⅞, 15/16 inch | a |
| 7 | NH | 1 inch | a |
| 8 | NH | 1 inch | a |
| 9 | NH | 1 inch | a |
| 10 | NH | 1 inch | b |
| 11 | NH | 15/16 inch | a |
| A | B at ⅛″ deflection | Structure destroyed | c |
| B | B at ⅛″ deflection | Structure destroyed | b |

[1] NB=no break; B=break; C=surface crack; NH=not harmed.
[2] a=sample not harmed; b=sample compressed to ¾ to ⅞ inch with only slight damage to structure; c=sample completely shattered.
A=commercial product A.
B=commercial product L.

As illustrated by the above comparative tests, the products of this invention show unexpected resilience, flexibility and resistance to impact. These properties make the new cellular plastic materials of value wherever plastic foams are useful, and particularly for insulating fillings, coatings, and the like.

We claim:

1. A cellular plastic material comprising the condensation product of an arylene diisocyanate and a fatty acid triglyceride having an hydroxyl number not materially less than 49, which have been condensed in amounts such that the ratio of the hydroxyl groups contained in the fatty acid triglyceride to the number of isocyanate groups in the arylene diisocyanate is between 0.45 and 0.95 to 2, reacted with an amount of water so as to provide about one mol of water per two unreacted isocyanate groups in the condensation mass.

2. A cellular plastic material comprising the water reaction product of an arylene diisocyanate-castor oil condensation product in which all of the hydroxyl groups of the castor oil have been reacted with the arylene diisocyanate but in which from 52.5% to 77.5% of the isocyanate groups of the arylene diisocyanate were unreacted prior to the reaction with water, the amount of water reacted with the condensation product being an amount so as to provide about one mol of water per two unreacted isocyanate groups in the condensation product.

3. A composition comprising the condensation product of a blown drying oil having an hydroxyl number not materially less than 49, said oil being selected from the group consisting of linseed oil, tung oil, poppyseed oil, hempseed oil and soya oil, and a sufficient amount of an arylene diisocyanate to react with all the hydroxyl groups contained in said oil but leaving from 52.5% to 77.5% of the isocyanate groups of the arylene diisocyanate unreacted.

4. A composition comprising the condensation product of castor oil and a sufficient amount of an arylene diisocyanate to react with all the hydroxyl groups contained in the castor oil but leaving from 52.5% to 77.5% of the isocyanate groups of the arylene diisocyanate unreacted.

5. A process for producing cellular plastic material which comprises condensing an arylene diisocyanate and a fatty acid triglyceride having an hydroxyl number not materially less than 49, in amounts such that the ratio of the hydroxyl groups contained in the fatty acid triglyceride to the number of isocyanate groups in the arylene diisocyanate is between 0.45 and 0.95 to 2, and reacting this condensation product with an amount of water so as to provide about one mol of water per two unreacted isocyanate groups in the condensation product.

6. In a process for preparing a cellular plastic material, the step which comprises condensing a fatty acid triglyceride having an hydroxyl number not materially less than 49, with a sufficient amount of an arylene diisocyanate to react with all the hydroxyl groups present in the fatty acid triglyceride and have remaining in the condensation product from 52.5% to 77.5% of the isocyanate groups of the arylene diisocyanate unreacted.

7. In a process for preparing a cellular plastic material, the step which comprises condensing a blown drying oil having an hydroxyl number not materially less than 49, said oil being selected from the group consisting of linseed oil, tung oil, poppyseed oil, hempseed oil and soya oil, with a sufficient amount of an arylene diisocyanate to react with all the hydroxyl groups present in said oil and have remaining in the condensation product from 52.5% to 77.5% of the isocyanate groups of the arylene diisocyanate unreacted.

8. In a process for preparing a cellular plastic material, the step which comprises condensing castor oil with a sufficient amount of an arylene diisocyanate to react with all the hydroxyl groups present in said oil and have remaining in the condensation product from 52.5% to 77.5% of the isocyanate groups of the arylene diisocyanate unreacted.

References Cited in the file of this patent

UNITED STATES PATENTS

| 2,577,279 | Simon et al. | Dec. 4, 1951 |
| 2,602,783 | Simon et al. | July 8, 1952 |
| 2,650,212 | Windemuth | Aug. 25, 1953 |

OTHER REFERENCES

Chemical Engineering, vol. 57, No. 4, pages 165 and 166.